United States Patent [19]
Bauer et al.

[11] Patent Number: 5,851,460
[45] Date of Patent: *Dec. 22, 1998

[54] PROCESS FOR THE MANUFACTURE OF A CERAMIC FOAM PART

[75] Inventors: Henri Bauer, Esslingen; Reiner Buck, Stuttgart; Antje Seitz, Moeglingen; Rainer Tamme, Ostfildern, all of Germany

[73] Assignee: Deutsche Forschungsanstalt fuer Luft- und Raumfahrt e.V., Germany

[ * ] Notice: This patent issued on a continued prosecution application filed under 37 CFR 1.53(d), and is subject to the twenty year patent term provisions of 35 U.S.C. 154(a)(2).

[21] Appl. No.: 799,643

[22] Filed: Feb. 11, 1997

Related U.S. Application Data

[63] Continuation of Ser. No. 389,681, Feb. 15, 1995, abandoned.

[30] Foreign Application Priority Data

Feb. 21, 1994 [DE] Germany .......................... 44 05 331.2

[51] Int. Cl.⁶ .......................... B29C 65/00; C04B 40/00; B05D 5/00
[52] U.S. Cl. ................. 264/43; 263/44; 263/82; 263/628; 427/244
[58] Field of Search .................. 264/42, 43, 44, 264/82, 628; 427/244

[56] References Cited

U.S. PATENT DOCUMENTS

| | | | |
|---|---|---|---|
| 4,713,302 | 12/1987 | Komatsu | 428/698 |
| 4,746,480 | 5/1988 | Clark | 264/62 |
| 5,001,090 | 3/1991 | Schwark | 501/97 |
| 5,260,096 | 11/1993 | Holzl et al. | 427/215 |
| 5,262,199 | 11/1993 | Desu et al. | 427/255.1 |

FOREIGN PATENT DOCUMENTS

| | | |
|---|---|---|
| 25 10 938 | 9/1976 | Germany . |
| 32 35 841 | 4/1983 | Germany . |
| 35 41 444 | 5/1987 | Germany . |
| 38 29 504 | 3/1990 | Germany . |

Primary Examiner—Christopher A. Fiorilla
Attorney, Agent, or Firm—Barry R. Lipsitz; Ralph F. Hoppin

[57] ABSTRACT

To provide a process for the manufacture of a ceramic part which is a ceramic part resistant to temperature changes and, in particular, suitable also for high temperatures, it is suggested that a formed body be produced by forming and sintering a ceramic material essentially comprising non-oxidic ceramic components and that the ceramic part be produced from the formed body by oxidizing the ceramic material starting from a surface of the formed body.

13 Claims, 2 Drawing Sheets

PROCESS FOR THE MANUFACTURE OF A CERAMIC FOAM PART

This application is a continuation of commonly assigned U.S. patent application Ser. No. 08/389,681 filed Feb. 15, 1995, now abandoned.

BACKGROUND OF THE INVENTION

The invention relates to a process for the manufacture of a ceramic part resistant to temperature changes and to a ceramic part resistant to temperature changes.

In the case of ceramic parts or elements, for example for volumetric absorbers, which are intended to withstand high temperatures, preferably temperatures greater than 800° C., an aluminum oxide ceramic is preferably used as ceramic material Such an aluminum oxide ceramic does, however, have the disadvantage that this is inferior with respect to resistance to temperature changes since cracks and chips occur once the ceramic part has been heated up and cooled several times and these lead to considerable damage and, therefore, to the ceramic part becoming unfit for use when a plurality of changes in temperature take place.

SUMMARY OF THE INVENTION

The object underlying the invention is therefore to provide a process for the manufacture of a ceramic part which is resistant to temperature changes and, in particular, also suitable for high temperatures and such a ceramic part which is resistant to temperature changes.

This object is accomplished according to the invention by a process for the manufacture of a ceramic part resistant to temperature changes, in which a formed body is produced by forming and sintering a ceramic material essentially comprising non-oxidic ceramic components and in which the ceramic part is produced from the formed body by oxidizing the ceramic material starting from a surface of the formed body.

The advantage of the inventive process is to be seen in the fact that first of all a formed body is produced from a ceramic material comprising non-oxidic ceramic components and that the ceramic part is then produced by oxidizing the non-oxidic ceramic material which is already sintered, starting from the surface of the formed body. This means that, on the one hand, this ceramic part has surface, oxidized ceramic components and, on the other hand, due to the manufacture of the formed body by sintering essentially non-oxidic ceramic components it has been given a mechanical strength which corresponds to that of non-oxidic ceramic components so that the ceramic part itself also combines improved mechanical properties, in particular with respect to resistance to temperature changes, with the oxidation resistance achieved due to the oxidation.

In this respect, it is particularly advantageous for the formed body to be produced with a contour similar to the ceramic part so that the shape is already determined by the sintering of the ceramic material consisting essentially of non-oxidic ceramic components and, therefore, the advantageous mechanical properties can be transferred to the later shape of the ceramic part in a particularly simple manner.

It is even particularly expedient for the formed body to be produced close to the final contour of the ceramic part.

A particularly expedient process provides for the final contour of the ceramic part to be achieved during oxidation of the formed body so that the alterations in volume resulting during oxidation are utilized to transform the formed body already produced close to the final contour into the desired shape of the ceramic part.

With respect to the manufacture of the formed body, the most varied of manufacturing processes are conceivable. The formed body is expediently produced with conventional manufacturing processes for the manufacture of ceramic formed bodies from the ceramic material.

Such conventional processes for the manufacture of formed bodies from ceramic material are, for example, the extrusion of dough-like ceramic substances with subsequent drying and baking, preferably used for the production of honeycomb ceramic structures for catalytic converters in motor vehicles. Another process is the deposition of ceramic substances from the gas phase (CVD), whereby solids which are deposited on suitable carrier structures result due to the reaction of gaseous components. A further, known process is the process for the manufacture of ceramic foam structures, in which an open-cell foamed plastic is saturated with a ceramic slurry so that a thin skin or film of ceramic material remains adhered to webs of the plastic foam. This ceramic material is dried and following the drying fired at high temperatures so that the foamed plastic is disintegrated to form gaseous reaction products and, moreover, the components of the ceramic material are baked together at the same time and, therefore, mechanically stabilized.

With respect to the composition of the inventive ceramic material it is preferable for this to have non-oxidic ceramic components to at least approximately 80%. It is even more advantageous for the ceramic material to have non-oxidic ceramic components to at least approximately 90% and even better to approximately 98%.

In this respect, it is tolerable for the ceramic material to have at the most approximately 20%, preferably approximately 5% of residual components which can also comprise oxidic ceramic components.

It is, in principle, possible to use mixtures of different non-oxidic ceramic components as ceramic material.

A particularly advantageous composition of the inventive ceramic material provides for this to have at least approximately 80%, even better 90%, of a first non-oxidic ceramic material.

In this respect, it is conceivable for the ceramic material to have at the most approximately 20%, even better at the most only 10%, of a second non-oxidic ceramic material.

In conjunction with the embodiments described thus far, no details have been given as to the extent, to which the oxidation takes place and the sintered ceramic material having essentially non-oxidic ceramic components is converted during the oxidation.

In one advantageous embodiment, for example, the oxidation takes place for such a time until at least 10% of the ceramic material of the formed body is oxidized.

An even better passivation to oxidation is achieved when 20%, even better 50% of the sintered ceramic material essentially comprising non-oxidic ceramic components is oxidized.

In particular with ceramic parts which have thin formed sections it is even possible for the oxidation to be carried out for such a time until 100% of the sintered ceramic material essentially having non-oxidic components is oxidized.

The advantage of the inventive solution is still to be seen in the fact that even with a 100% oxidation of the sintered ceramic material essentially having non-oxidic components the mechanical properties of this material are considerably better than those of oxidic ceramic materials produced in a conventional manner.

Alternatively, a sufficient passivation of the inventive ceramic part to oxidation, in particular at high temperatures, can be determined by the thickness of the oxidized layer of ceramic material which is formed starting from the surface of the formed body.

The thickness of the layer is preferably at least 0.02 mm, even better at least 0.05 mm; a very good passivation is achieved when the thickness of the layer is 0.1 mm, even better 0.2 mm.

With respect to the oxidation, again no further, specific details have been given in conjunction with the preceding description of the inventive process.

In an advantageous procedure, the sintering is followed immediately by the oxidation, preferably without any intervening cooling to room temperature. It has proven to be advantageous with respect to the oxidation for the oxidation to take place at temperatures of more than 800° C., preferably more than 1000° C. and even better more than 1200° C.

The heating or baking time during oxidation is, in this respect, advantageously at least 1 hour, even better at least 10 and even better at least 50 hours, for example at a temperature of approximately 1400° C.

With respect to the heating time, it has, however, become apparent that it is advantageous for this to be at the most 200hours.

With respect to the type and, in particular, the shape of the ceramic part, no further details have so far been given. Particular advantages of the inventive solution have resulted, for example, when a ceramic foam is produced as ceramic part.

Such a ceramic foam is preferably produced with a web thickness of approximately 0.1 to approximately 1 mm.

A ceramic foam of this type expediently has a pore size of approximately 0.5 mm to approximately 5 mm.

Particularly advantageous uses of such a ceramic foam result when this is produced as an open-cell ceramic foam.

Such ceramic foams are preferably used in all types of chemical reactions, in particular such ceramic foams can be used in receivers for utilizing solar energy for high-temperature applications, in particular so-called volumetric absorbers, in an advantageous manner. In this type of absorber, the radiation is absorbed in the volume of the porous ceramic foam, which has a heat transport medium flowing through it at the same time. In this way, the absorbed radiation energy is transferred to the heat transport medium.

An expedient embodiment of such a volumetric absorber provides for air to be used as heat transport medium, whereby the use of air as heat transport medium requires a high porosity and low web thickness, on the other hand a high oxidation resistance up to approximately 1400° C. and, finally, the good resistance to temperature changes which can be achieved in accordance with the invention.

Moreover, the inventive object is also accomplished by a ceramic part which is produced according to any or several of the process steps described in the above.

In addition, the inventive object is accomplished in a ceramic part which is formed from sintered ceramic material essentially comprising non-oxidic ceramic components, whereby the ceramic material is subsequently oxidized in a passivated surface area starting from a surface of the ceramic part.

Such a ceramic part has the same advantages as those already described at the outset in conjunction with the inventive process.

In this respect, it is particularly expedient for the ceramic part to have a core region made of sintered ceramic material essentially comprising non-oxidic ceramic components.

Alternatively thereto, it is, however, also conceivable for the ceramic material of the entire ceramic part to be oxidized subsequently.

The ceramic part is preferably structured such that the sintered ceramic material essentially comprising non-oxidic ceramic components consists to at least approximately 80%, even better at least approximately 90% or best of all at least approximately 98% of non-oxidic ceramic components which are oxidized completely or partially in accordance with an extension of the passivated surface area.

With respect to a sufficient passivation of the inventive ceramic part, it is particularly advantageous for approximately 10% of the ceramic material to be oxidized; it is even better for 20% to be oxidized and still better for 50% of the ceramic material to be oxidized.

This preferably results in layer thicknesses of the oxidized ceramic material proceeding from the surface of at least 0.02, even better 0.05 mm and in particularly well passivated ceramic parts at least 0.1, even better 0.2 mm.

A particularly advantageous, inventive embodiment provides for the ceramic part to be a ceramic foam, preferably with the parameters already described in the above.

Additional features and advantages of the invention are the subject matter of the following description as well as of the drawings of one embodiment.

DETAILED DESCRIPTION OF THE INVENTION

Figure 1:
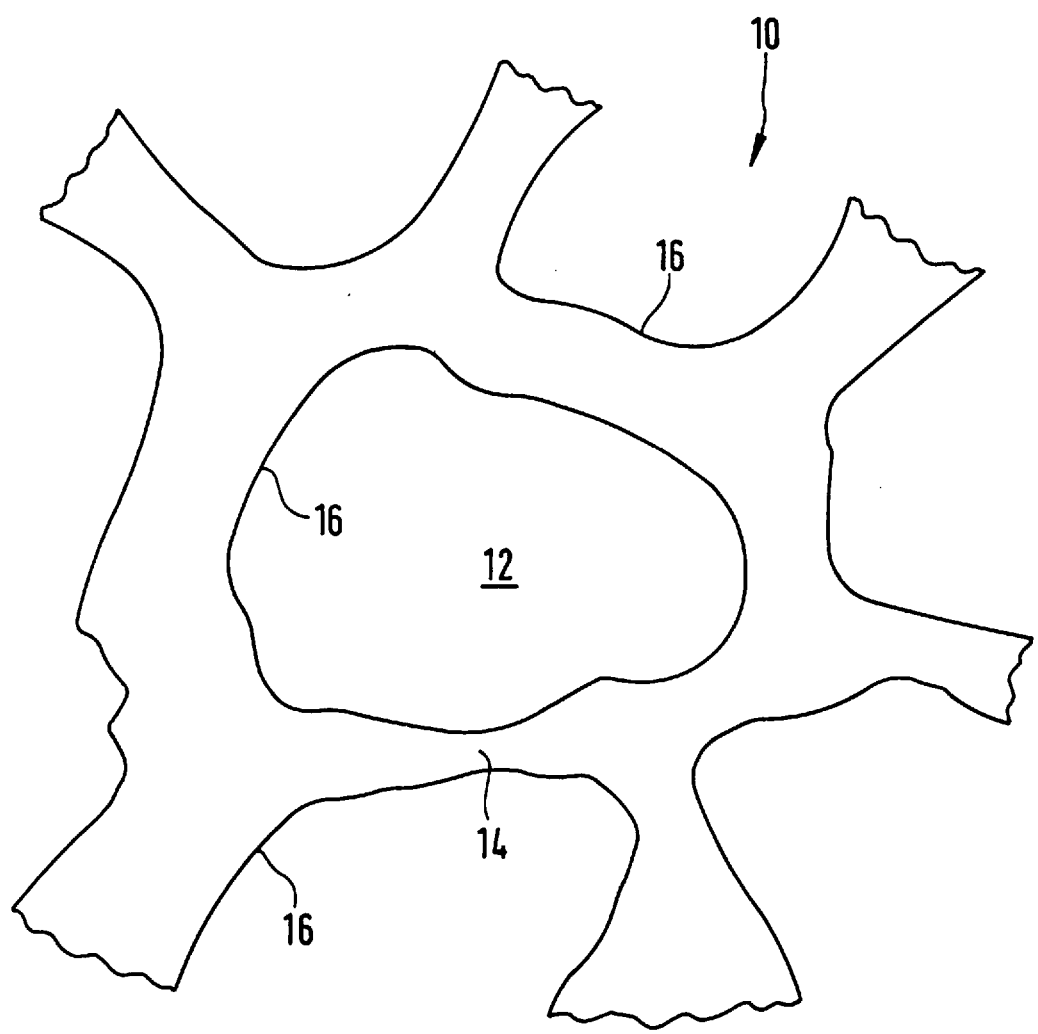
FIG. 1 shows a sectional illustration of a formed body produced according to the invention for the manufacture of a foam structure for an inventive ceramic part and FIG. 2 is a schematic illustration of the section of the inventive ceramic part illustrated in FIG. 1.

In the embodiment, the ceramic foam illustrated in FIG. 1 is first of all produced as a formed body, namely from a ceramic material which consists to 90% of alpha/beta-$Si_3N_4$ and to 10% of SiC and has traces of $Si_2ON_2$ and other residual components.

The manufacture of the formed body results, for example, in that an open-cell foamed plastic is saturated with a ceramic slurry, whereby a thin film consisting of the ceramic material specified above remains adhered to the webs of the foamed plastic. The ceramic slurry comprises a ceramic solvent as suspension agent, organosilicon compounds as temporary binders and metallic silicon powders. Subsequently, the formed body is carbonized with an inert gas and nitrated following possible green treatment. After nitration, a reaction-bonded material results without secondary bonding phases or glass phases at the grain boundaries.

Such a process is described, for example, in the periodical cfi/Ber. DKG66, 1989, No. 10, pages 468 to 472 of V. Braetsch or in DE-OS 23 47 760. The ceramic material is then baked together and thereby mechanically stabilized. The formed body illustrated in FIG. 1 and designated as a whole as 10comprises, by way of example, one pore 12 which is surrounded by webs 14 of the formed body consisting of the sintered ceramic material.

Finally, the webs 14 of the formed body consist of the aforementioned ceramic material.

This formed body is subsequently oxidized preferably at temperatures of 1400° C. for 150 hours in an oxidizing atmosphere. The nitration can expediently be followed immediately by this oxidation, for example by replacing the nitrating agent by an oxidizing agent, without any cooling taking place between the nitration and the oxidation. This results in a layer 18 which is formed starting from a surface 16 of the webs 14 and in which the ceramic material specified above is oxidized, whereby the $Si_3N_4$ is converted to $SiO_2$ and also the SiC to $SiO_2$. In addition, this leads to an alteration in the volume which is illustrated in an exaggerated manner in FIG. 2 so that the surface 16' migrates outwardly in comparison with the original surface 16 of the formed body since an increase in volume results due to the oxidation and this is apparent in an alteration in length in the order of 1% and an increase in weight of approximately 15%.

Figure 2:
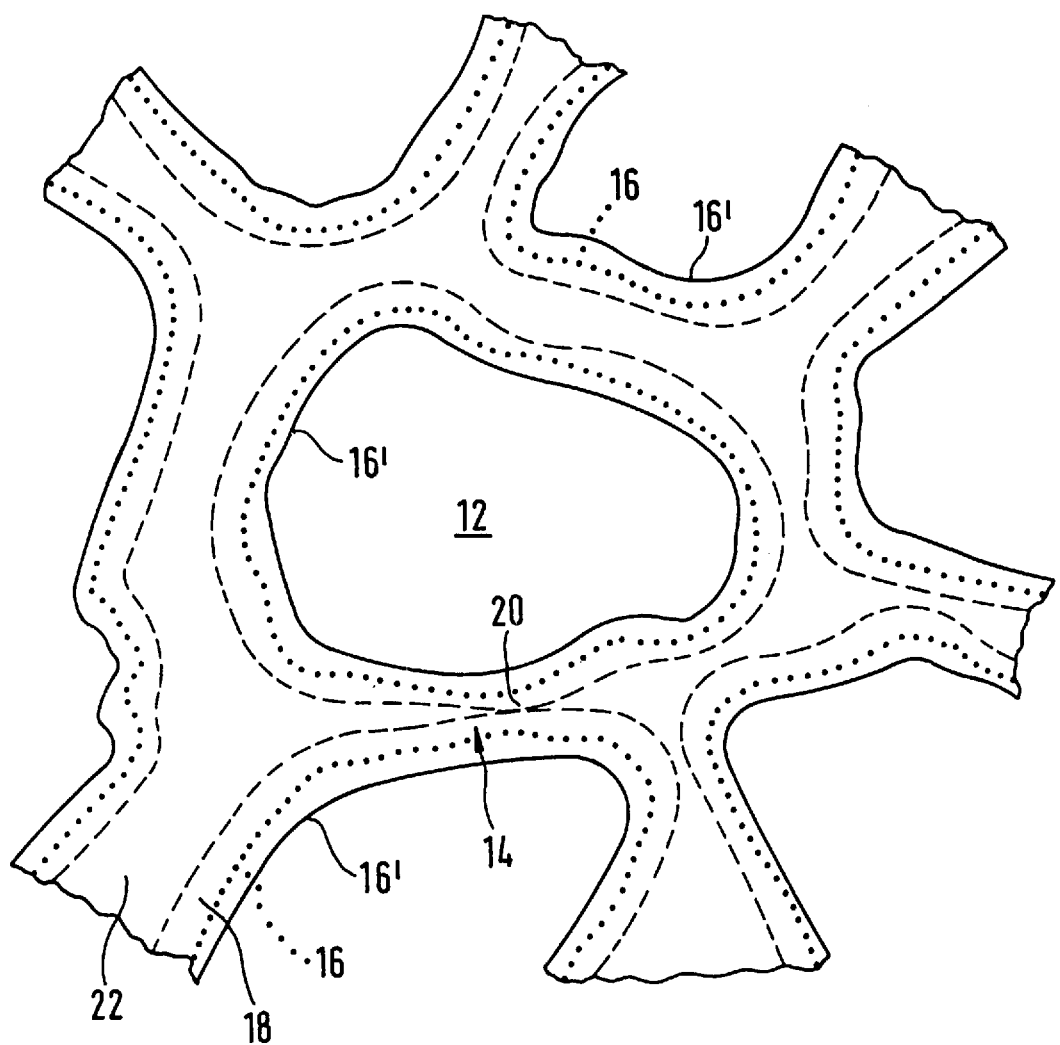

Furthermore, it is apparent from FIG. 2 that the layers of oxidized ceramic material merge into one another, particularly, in thin regions 20 of the webs 14 and so in these thin regions 20 of the webs 14 the ceramic material is completely oxidized over the entire cross section of the webs 14.

Outside the region 20, where the webs 14 have a greater thickness, the webs 14 also comprise a core region 22 consisting of non-oxidized, merely sintered non-oxidic ceramic material which is, however, screened from external influences by the layer 18 consisting of oxidized ceramic material.

The ceramic part having a foamed structure illustrated in Figure has, on the one hand, a high resistance to temperature changes which is far better than that of aluminum oxide and, on the other hand, an adequately good resistance to oxidizing atmospheres, even at temperatures above 800° C.

Such inventive structures can, however, also be produced from all types of non-oxidic ceramic materials, for example carbides, such as silicon carbide, titanium carbide, boron carbide, zirconium carbide, tungsten carbide, or from nitrides, such as the silicon nitride already mentioned, boron nitride or titanium nitride.

What is claimed is:

1. Process for manufacturing a ceramic part, comprising the steps of:

forming and sintering a ceramic material comprising non-oxidic ceramic components including at least one of a carbide and a nitride to obtain a formed body of an open cell porous ceramic foam material having pores surrounded by webs to provide a flow path for a transport medium, said formed body having a contour which is close to a final contour with a desired dimension of said ceramic part;

said contour of said formed body being defined by an outer surface thereof; and oxidizing the at least one of a carbide and a nitride of said ceramic material of said formed body starting from said outer surface of said formed body by exposing said outer surface to an oxidizing agent in an oxidizing atmosphere, thereby converting the at least one of a carbide and a nitride to an oxide at said outer surface of said formed body and at least partially into a cross section thereof to cause at least a portion of said formed body to expand in a controlled manner to achieve said final contour with said desired dimension merely by said oxidation step;

wherein the oxidation is carried out for such a time until substantially all exposed surfaces of the ceramic material including the pores thereof which provide flow paths for said transport medium have been passivated by said oxide.

2. Process as defined in claim 1, characterized in that the formed body is produced with conventional manufacturing processes for ceramic formed bodies made of the ceramic material.

3. Process as defined in claim 1, characterized in that the ceramic material has at least approximately 80% of non-oxidic ceramic components.

4. Process as defined in claim 1, characterized in that the ceramic material has at least approximately 80% of a first non-oxidic ceramic material.

5. Process as defined in claim 4, characterized in that the ceramic material has at the most approximately 20% of a second non-oxidic ceramic material.

6. Process as defined in claim 1, characterized in that the oxidation is carried out for such a time until at least approximately 10% of the ceramic material is oxidized.

7. Process as defined in claim 1, characterized in that the oxidation is carried out at temperatures of more than approximately 800° C.

8. Process as defined in claim 1, characterized in that the heating time during oxidation is at least 1 hour.

9. Process as defined in claim 1, characterized in that the heating time during oxidation is at the most 200 hours.

10. Process as defined in claim 1, characterized in that the ceramic foam is produced as an open-cell ceramic foam.

11. A process as defined in claim 1 wherein a final weight of said formed body after said oxidizing step is at least approximately fifteen per cent greater than an initial weight of said formed body prior to said oxidizing step.

12. A process as defined in claim 1 wherein said oxidizing step improves the resistance of said foam to damage due to temperature variations.

13. A process for manufacturing a ceramic part with a desired final contour, comprising the steps of:

obtaining a formed body with an initial contour which is close to said final contour by forming and sintering a ceramic material comprising non-oxidic ceramic components including at least one of a carbide and a nitride;

said formed body comprising an open cell ceramic foam material having pores surrounded by webs to provide a flow path for a transport medium;

said initial contour of said formed body being defined by an outer surface thereof; and oxidizing said formed body starting from said outer surface by exposing said outer surface to an oxidizing agent in an oxidizing atmosphere in a controlled manner to convert the at least one of a carbide and a nitride to an oxide at said outer surface and at least partially into a cross section thereof, thereby causing at least a portion of said formed body to expand in a correspondingly controlled manner to achieve said desired final contour merely by said oxidation step;

wherein the oxidation is carried out for such a time until substantially all exposed surfaces of the ceramic material including the pores thereof which provide flow paths for said transport medium have been nassivated by said oxide.

* * * * *